(12) United States Patent
Chakrabarti et al.

(10) Patent No.: US 8,813,223 B2
(45) Date of Patent: Aug. 19, 2014

(54) SECURE NETWORK TOPOLOGY ON A VIRTUALIZED SERVER

(75) Inventors: Somnath Chakrabarti, Hillsboro, OR (US); Jason A. Davidson, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 13/557,336

(22) Filed: Jul. 25, 2012

(65) Prior Publication Data
US 2013/0191912 A1    Jul. 25, 2013

Related U.S. Application Data

(60) Provisional application No. 61/511,810, filed on Jul. 26, 2011.

(51) Int. Cl.
*G06F 11/00*    (2006.01)

(52) U.S. Cl.
USPC .............................................. 726/22; 726/23

(58) Field of Classification Search
CPC . H04L 63/146; H04L 63/145; H04L 63/1408; H04L 63/1425; H04L 63/20; H04L 9/08; H04L 63/0428; H04L 63/0263; H04L 63/0281; H04L 63/0227; H04L 63/0272; G06F 21/305; G06F 21/445; G06F 21/45
USPC ........... 726/11–15, 22–24, 2–3; 713/150–154
See application file for complete search history.

(56) References Cited

U.S. PATENT DOCUMENTS

| 7,493,654 | B2* | 2/2009 | Bantz et al. ........................ 726/4 |
| 8,060,074 | B2* | 11/2011 | Danford et al. ............... 455/419 |
| 2012/0124581 | A1* | 5/2012 | Nitta ................................. 718/1 |

OTHER PUBLICATIONS

IEEE 802.3 Section One—Clause 1 through Clause 20 and Annex H and Annex 4A, 2003 IEEE, 671 pages.
IEEE 802.3 Section Two—Clause 21 trough Clause 33 and Annex 22A through Annex 33E, 2008 IEEE, 790 pages.
IEEE 803.2 Section Three—Clause 34 through Clause 43 and Annex 36A through Annex 43C, 2008 IEEE, 315 pages.
IEEE 802.3 Section Four—Clause 44 through Clause 55 and Annex 44A through Annex 55B, 2008 IEEE, 586 pages.
IEEE 802.3 Section Five—Clause 56 through Clause 74 and ANnex 57A through Annex 74A, 2008 IEEE, 615 pages.

* cited by examiner

*Primary Examiner* — Hosuk Song
(74) *Attorney, Agent, or Firm* — Grossman, Tucker, Perreault & Pfleger, PLLC

(57) ABSTRACT

Generally, this disclosure describes a secure network topology on a virtualized server (and methods thereof). A virtualization management module is deployed as part of a software layer of a virtualized server system. The virtualization management module generates an internal network among the virtual machines and controls access to the network. The virtualization management module translates incoming and outgoing traffic between the virtual machines and an external internet IP address, thus keeping the virtual machines indirectly coupled to the external network. The virtualization management module also provides remote administration and control over each virtual machine (or collection of virtual machines).

30 Claims, 3 Drawing Sheets

100

SECURE NETWORK TOPOLOGY ON A VIRTUALIZED SERVER

CROSS REFERENCE TO RELATED APPLICATIONS

This application claims the benefit of U.S. Provisional Application No. 61/511,810 filed Jul. 26, 2011, which is incorporated by reference herein in its entirety.

FIELD

This disclosure relates to a secure network topology on a virtualized server.

BACKGROUND

Currently, for virtualized systems, each virtual machine is assigned a unique IP address, and each virtual network interface is logically connected to the physical network interface of the server. Thus, since each virtual machine requires its own IP address to connect externally, cost and maintenance of the server increases. In addition, each IP address connected externally exposes each virtual machine directly to the internet, which may increase malware/virus risk significantly.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a secure network topology on a virtualized server (and methods thereof). A virtualization management module is deployed as part of a software layer of a virtualized server system. The virtualization management module may be configured to generate an internal network among the virtual machines and control access to the network. The virtualization management module may also translate incoming and outgoing traffic between the virtual machines and an external internet IP address, thus keeping the virtual machines indirectly coupled to the external network. The virtualization management module may also decouple the internal network from the external internet IP address in the event of a detected security threat and provide remote administration and control over each virtual machine (or collection of virtual machines).

System Architecture

Figure 1:
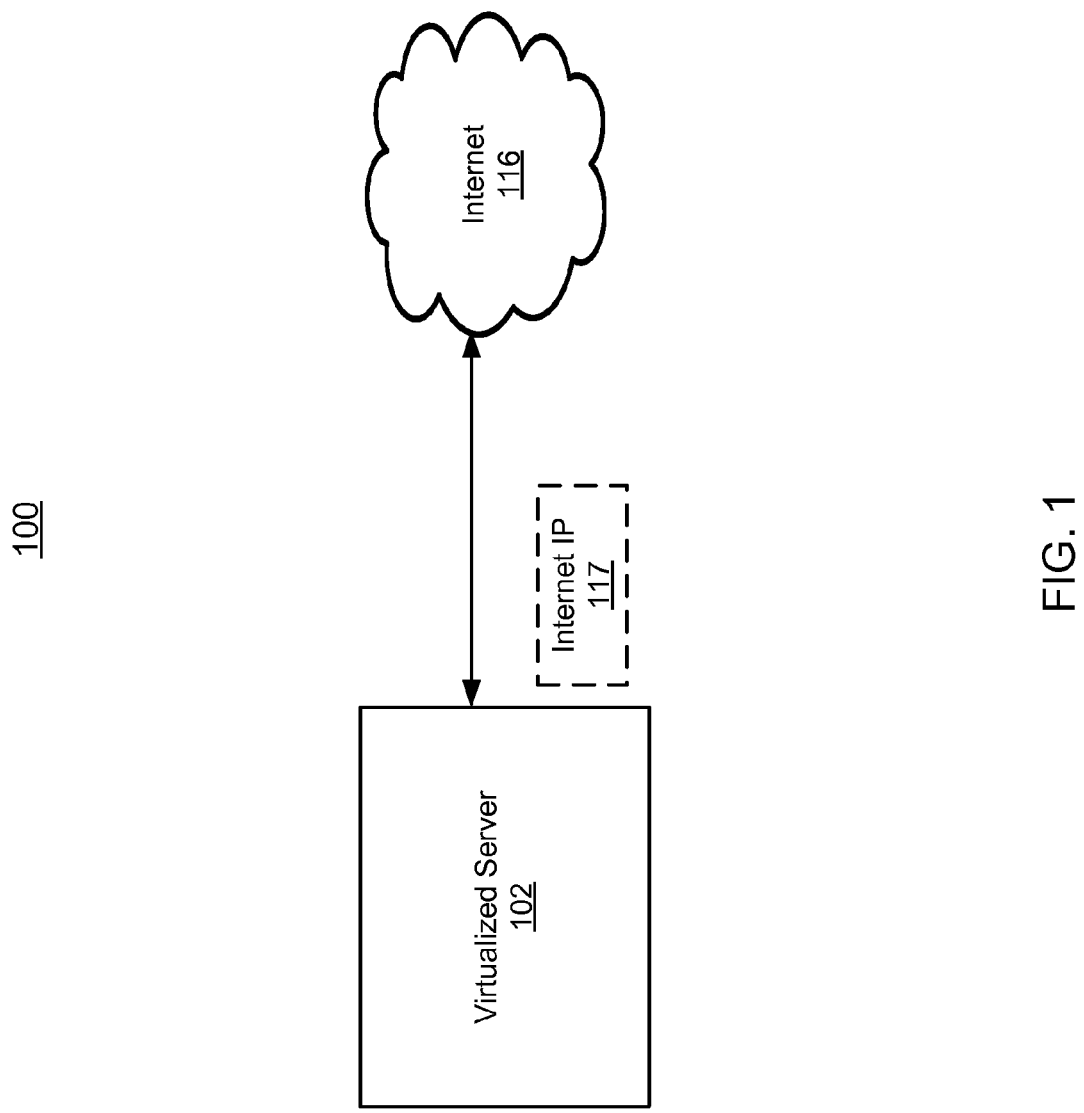
FIG. 1 illustrates a top-level block diagram of one exemplary embodiment consistent with the present disclosure.

FIG. 1 illustrates a top-level block diagram 100 of one exemplary embodiment consistent with the present disclosure. The system 100 of this embodiment generally includes a virtualized server system 102 that is configured to host one or more virtual machines and communicate externally, e.g., to the internet 116, using an external internet IP address 117.

Figure 2:
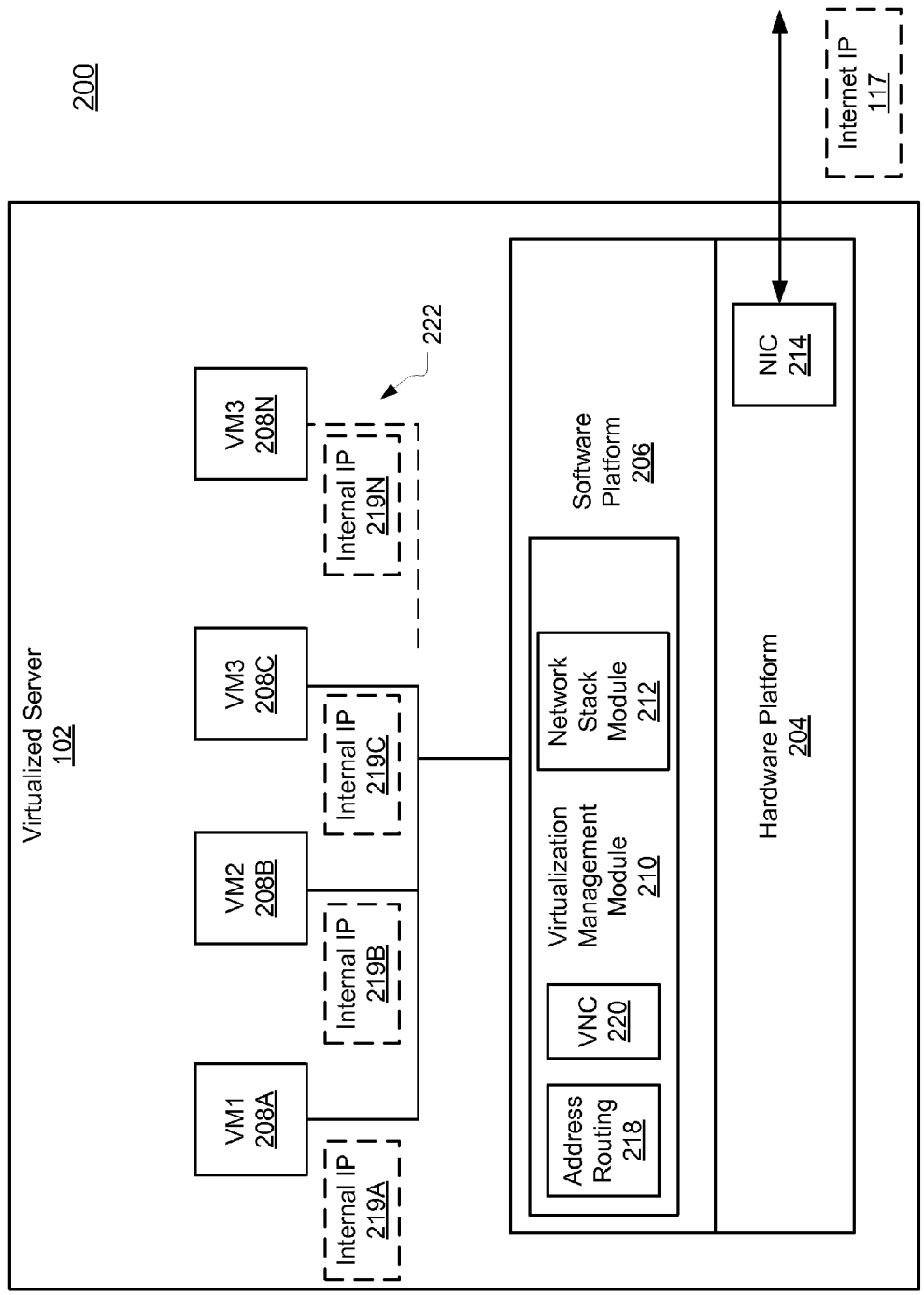
FIG. 2 illustrates one exemplary server system diagram consistent with various embodiments of the present disclosure.

FIG. 2 illustrates a block diagram 200 of one exemplary embodiment consistent with the present disclosure. Details of the virtualized server system 102 are shown. The server 102 includes a hardware platform 204, a software platform 206 and at least one virtual machine (VM), designated as VM1 208A, VM2 208B, VM3 208C, ..., VMN 208N. The hardware platform 204 may include an Intel-based host processor (not shown), a network interface card (NIC) 214, a hard disk drive and memory (not shown), as well as the necessary operable support circuitry, operating system, software and/or firmware. In addition, the hardware platform may include trusted (secure) processing circuitry such as, for example, a trusted platform module (TPM), trusted execution technology (TXT), etc. The NIC 214 is configured to communicate with the internet 116 using, for example, one or more network communication protocols (e.g., UDP, TCP/IP, etc.). The NIC 214 may be configured to communicate with the internet 116 using a single internet IP address 117 (e.g., static IP address, etc.) on a physical network port (e.g., PHY), and the server system 102 may be configured to service a plurality of virtual machines 208 using the single IP address 117, as will be explained in greater detail below.

It is assumed that, in some embodiments, each virtual machine operates in a similar manner, and thus, the virtual machines are collectively or individually referred to herein using the designation 208. The VMs 208 may be generally configured as a separate, independent instance of an operating system, and may also include network services such as web server, mail server, firewall, backup, administration, database, etc, and may also be configured for hardware virtualization and/or emulation. Each VM 208 may be deployed using custom or off-the-shelf operating system, for example, one or more VMs 208 may be configured to run Microsoft® Server 2008, SBS, XP Win7, etc.; firewall virtual machine software including Astaro, Linux, etc.; backup virtual machine software including Vembu Storegrid, Symantec, etc.; and/or network management virtual machine software including Level Platforms, Keseya, etc. Each VM 208 may be configured with at least one virtual interface to communicate with the software platform 206 and the hardware platform 204, as will be described below.

The software platform 206 is generally configured to control at least one virtual machine 208. To that end, the software platform 206 may include custom and/or off-the-shelf virtualization software (code), for example, Centrix Xenserver, VMWare®, or other well-known virtualization platforms. In various embodiments, the software platform 206 may include a virtualization management module 210.

The virtualization management module 210 is generally configured to generate and control an internal network 222 (e.g., internal LAN, private network, etc.) for communication between the software platform 206 and the VMs 208. In this example, the internal network 222 includes some or all of the VMs 208, and each VM is assigned an internal network IP address 219A, 219B, 219C, ..., 219N (referred to herein collectively as 219). Generally, the internal IP addresses 219 are not externally available (i.e., the internal IP addresses remain hidden from the internet 116). The virtualization management module 210 may include a network stack module 212. The network stack module 212 includes a well-known set of protocols (embodied as software layers) used for communication between the server system 102 and the internet 116. In general, the network stack module 212 is configured to filter incoming packets (received on the NIC 214) on the basis of, for example, destination TCP/UDP ports. The network stack module 212 may also be configured to perform typical stack operations which may include, for example, destination network address translation (DNAT) operations, firewall operations, etc.

In addition, the virtualization management module 210 is generally configured to provide resource allocation and power state of each of the VMs 208. The module 210 may include an internal IP address routing module 218 configured to translate the internet IP address 117 to one or more internal network IP addresses 219 (and vice-versa), using for example routing tables, etc. To that end, module 218 may be configured to perform DNAT operations, header parsing, etc. to translate and resolve send and receive traffic between the VMs 208 and the internet 116. The module 210 may also include a virtual network console (VNC) 220 configured to provide viewing and control of each VM 208 remotely, e.g., via the internet 116.

In operation, incoming packets (RX) are received from the internet 116 via the internet IP address 117 and passed to the network stack module 212. The network stack module 212 filters the incoming packets (based on, for example destination TCP/UDP port information) to determine which virtual machine 208 to forward the packets. The virtualization management module 210, via the internal IP address routing module 218, determines the appropriate internal IP address 219 and forwards the packets to the appropriate VM 208 Likewise, packets transmitted (TX) from one or more VMs 208, via internal network 222, are mapped to the internet IP address 117 and forwarded to the NIC 214 to send to a destination via the internet 116. If a security threat (e.g., virus, malware, hacking activity, etc.) is detected by the NIC 214, network stack module 212, virtualization management module 210 and/or other threat assessment hardware or software (not shown), the VNC 220 is configured to logically decouple one or more virtual machines 208 from the internal network 222 (and from the external internet traffic along the internet IP address 117), thus protecting the VMs 208 from external security threats. To permit virtual machine management even in the event of a security threat, the VNC 220 is configured to permit direct remote control over one or more virtual machines 208 to enable, for example, remote administration and management of the virtual machines 208.

Thus, instead of requiring that each VM 208 be assigned a unique internet IP address 117, the virtualization management module 210 provides an interface, at the software platform layer 206, to translate between an external IP internet address 117 and a local internal network 222. Advantageously, the virtualization management module 210 provides a mechanism to service a plurality of virtual machines without requiring each virtual machine to obtain and manage a unique internet IP address. Also advantageously, instead of deploying a management layer on each virtual machine, the virtualization management module 210 provides a unified management approach that enables security threat management, service management and control at an individual virtual machine level, or globally to all virtual machines 208 on the internal network 222. By keeping the internal network 222 hidden from the external IP address 117, security threat response and management is greatly enhanced.

It should be noted that the term "module," as used herein, may be embodied as software (which may include, for example, instructions or code), hardware (e.g. circuitry, etc.) and/or firmware that is configured to perform the operations stated herein. In addition, "circuitry" or "circuit", as used herein, may comprise, for example, singly or in any combination, hardwired circuitry, programmable circuitry, state machine circuitry, and/or circuitry available in a larger system, for example, discrete elements that may be included as part of an integrated circuit chip.

Exemplary Methodology

Figure 3:
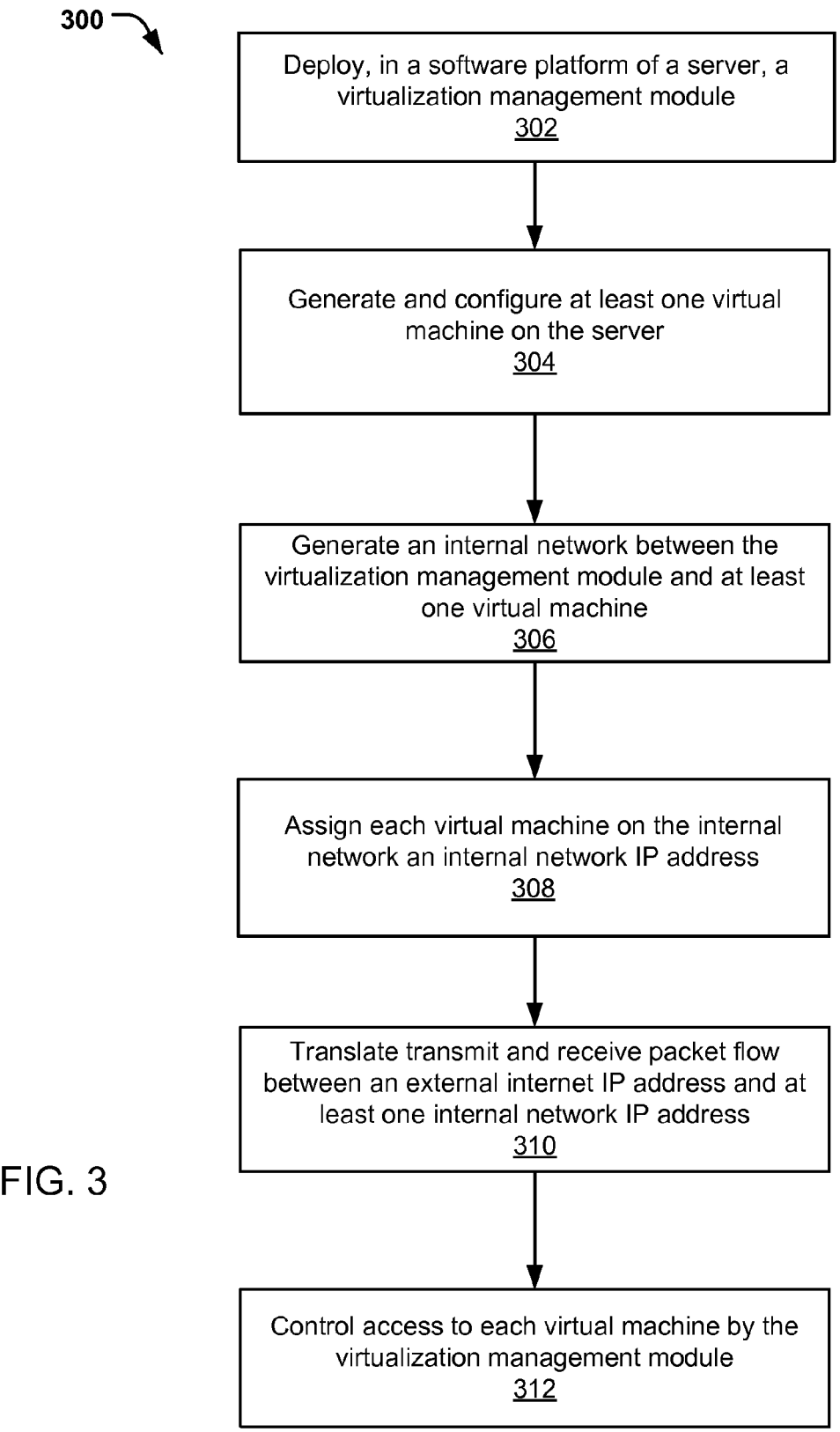
FIG. 3 illustrates a flowchart of exemplary operations consistent with one embodiment of the present disclosure.

FIG. 3 illustrates a flowchart 300 of exemplary operations consistent with one embodiment of the present disclosure. Operations of this embodiment include deploying, in a software platform of a server, a virtualization management module 302. Operations of this embodiment also include generating and configuring at least one virtual machine on the server 304, and generating an internal network between the virtualization management module and at least one virtual machine 306. Operations may also include assigning to each virtual machine on the internal network an internal network IP address 308. Operations may also include translating transmit and receive packet flows between an external internet IP address and at least one internal IP address 310. Operations may also include controlling, by the virtualization management module, access to each virtual machine on the internal network 312.

While FIG. 3 illustrates various operations according an embodiment, it is to be understood that in not all of these operations depicted in FIG. 3 are necessary for any embodiment. Indeed, it is fully contemplated herein that in other embodiments of the present disclosure, the operations depicted in FIG. 3 may be combined with other operations described herein in a manner not specifically shown in any of the drawings, but still fully consistent with the present disclosure. Thus, claims directed to features and/or operations that are not exactly shown in one drawing are deemed within the scope and content of the present disclosure.

Embodiments of the methods described herein may be implemented in a system that includes one or more tangible, non-transitory storage mediums having stored thereon, individually or in combination, instructions that when executed by one or more processors perform the methods. Here, the processor may include, for example, a system CPU and/or other programmable circuitry. Thus, it is intended that operations according to the methods described herein may be distributed across a plurality of physical devices, such as processing structures at several different physical locations. The tangible, non-transitory storage medium may include, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

Modifications to the present disclosure may be made. For example, the virtualized server system 102 may further include an encryption/decryption layer that may be logically present in the hardware platform 204, the software platform 206, or both. In addition, while the virtualization management module 210 is depicted in FIG. 2 as embodied in the software platform 206, in other embodiments the virtualization management module 210 may be deployed in a separate control domain that is logically separate from the software platform 206. In addition, the virtualization management module 210 may include a user interface (e.g., network-accessible HTML graphical user interface, etc.) that permits remote control and administration of the virtual machines 208.

Thus the present disclosure provides methods and systems for a secure network topology on a virtualized server. According to one aspect there is provided a method. The method may include configuring a virtualization management module for deployment on a server system. The method of this example may also include generating and configuring at least one virtual machine on the server system. The method of this example may further include configuring an internal network between the virtualization management module and the at least one virtual machine. The method of this example may further include translating, by the virtualization management module, transmit and receive packets between an external internet IP address and the internal network.

Another example method includes the forgoing operations and further includes assigning each virtual machine on the internal network an internal IP address, and each internal IP address is hidden from the external internet IP address.

Another example method includes the forgoing operations and further includes providing, by the virtualization management module, administration and control over each virtual machine on the internal network.

Another example method includes the forgoing operations and further includes decoupling, by the virtualization management module, the internal network from the external internet IP address in the event of a detected security threat on the external internet IP address.

Another example method includes the forgoing operations and further includes providing a trusted platform module configured for secure virtualization management module processing, and the secure processing further includes data encryption.

Another example method includes the forgoing operations and further includes providing a network accessible user interface configured to remotely administer and control each virtual machine.

According to another aspect there is provided a system. The system may include a virtualized server system. The system of this example may also include a virtualization management module and at least one virtual machine coupled to the virtualization management module. The system of this example may further include an internal network configured to provide communication between the virtualization management module and the at least one virtual machine. The system of this example may further include an address routing module configured to translate transmit and receive packets between an external internet IP address and the internal network.

Another example system includes the forgoing components and an internal IP address is assigned to each virtual machine on the internal network and each internal IP address is hidden from the external internet IP address.

Another example system includes the forgoing components and the virtualization management module is further configured to provide administration and control over each virtual machine on the internal network.

Another example system includes the forgoing components and the virtualization management module is further configured to decouple the internal network from the external internet IP address in the event of a detected security threat on the external internet IP address.

Another example system includes the forgoing components and further includes a trusted platform module configured to securely host the virtualization management module, and the secure hosting further includes data encryption.

Another example system includes the forgoing components and further includes a network accessible user interface configured to remotely administer and control each virtual machine. According to another aspect there is provided at least one computer-readable storage medium having instructions stored thereon which when executed by a processor, cause the processor to perform the steps of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
   configuring a virtualization management module for deployment on a server system;
   generating and configuring at least one virtual machine on the server system;
   configuring an internal network between the virtualization management module and the at least one virtual machine;
   assigning each virtual machine on the internal network an internal IP address, wherein each internal IP address is hidden from the external internet IP address; and
   translating, by the virtualization management module, transmit and receive packets between an external internet IP address and the internal network.

2. The method of claim 1, further comprising:
   providing, by the virtualization management module, administration and control over each virtual machine on the internal network.

3. The method of claim 1, further comprising:
   decoupling, by the virtualization management module, the internal network from the external internet IP address in the event of a detected security threat on the external internet IP address.

4. The method of claim 1, further comprising:
   providing a trusted platform module configured for secure virtualization management module processing, wherein the secure processing further comprises data encryption.

5. The method of claim 1, further comprising:
   providing a network accessible user interface configured to remotely administer and control each virtual machine.

6. A virtualized server system, comprising:
   a virtualization management module;
   at least one virtual machine coupled to the virtualization management module;
   an internal network configured to provide communication between the virtualization management module and the at least one virtual machine; and
   an address routing module configured to translate transmit and receive packets between an external internet IP address and the internal network;

wherein an internal IP address is assigned to each virtual machine on the internal network and each internal IP address is hidden from the external internet IP address.

7. The system of claim 6, wherein the virtualization management module is further configured to provide administration and control over each virtual machine on the internal network.

8. The system of claim 6, wherein the virtualization management module is further configured to decouple the internal network from the external internet IP address in the event of a detected security threat on the external internet IP address.

9. The system of claim 6, further comprising a trusted platform module configured to securely host the virtualization management module, wherein the secure hosting further comprises data encryption.

10. The system of claim 6, further comprising a network accessible user interface configured to remotely administer and control each virtual machine.

11. A non-transitory computer-readable storage medium having instructions stored thereon which when executed by a processor result in the following operations comprising:
configuring a virtualization management module for deployment on a server system;
generating and configuring at least one virtual machine on the server system;
configuring an internal network between the virtualization management module and the at least one virtual machine;
assigning each virtual machine on the internal network an internal IP address, wherein each internal IP address is hidden from the external internet IP address; and
translating, by the virtualization management module, transmit and receive packets between an external internet IP address and the internal network.

12. The non-transitory computer-readable storage medium of claim 11, further comprising the operations of:
providing, by the virtualization management module, administration and control over each virtual machine on the internal network.

13. The non-transitory computer-readable storage medium of claim 11, further comprising the operations of:
decoupling, by the virtualization management module, the internal network from the external internet IP address in the event of a detected security threat on the external internet IP address.

14. The non-transitory computer-readable storage medium of claim 11, further comprising the operations of:
performing secure virtualization management module processing on a trusted platform module, wherein the secure processing further comprises data encryption.

15. The non-transitory computer-readable storage medium of claim 11, further comprising the operations of:
remotely administering and controlling each virtual machine through a network accessible user interface.

16. A method, comprising:
configuring a virtualization management module for deployment on a server system;
generating and configuring at least one virtual machine on the server system;
configuring an internal network between the virtualization management module and the at least one virtual machine;
translating, by the virtualization management module, transmit and receive packets between an external internet IP address and the internal network; and
decoupling, by the virtualization management module, the internal network from the external internet IP address in the event of a detected security threat on the external internet IP address.

17. The method of claim 16, further comprising:
assigning each virtual machine on the internal network an internal IP address, wherein each internal IP address is hidden from the external internet IP address.

18. The method of claim 16, further comprising:
providing, by the virtualization management module, administration and control over each virtual machine on the internal network.

19. The method of claim 16, further comprising:
providing a trusted platform module configured for secure virtualization management module processing, wherein the secure processing further comprises data encryption.

20. The method of claim 16, further comprising:
providing a network accessible user interface configured to remotely administer and control each virtual machine.

21. A virtualized server system, comprising:
a virtualization management module;
at least one virtual machine coupled to the virtualization management module;
an internal network configured to provide communication between the virtualization management module and the at least one virtual machine; and
an address routing module configured to translate transmit and receive packets between an external internet IP address and the internal network;
wherein the virtualization management module is further configured to decouple the internal network from the external internet IP address in the event of a detected security threat on the external internet IP address.

22. The system of claim 21, wherein an internal IP address is assigned to each virtual machine on the internal network and each internal IP address is hidden from the external internet IP address.

23. The system of claim 21, wherein the virtualization management module is further configured to provide administration and control over each virtual machine on the internal network.

24. The system of claim 21, further comprising a trusted platform module configured to securely host the virtualization management module, wherein the secure hosting further comprises data encryption.

25. The system of claim 21, further comprising a network accessible user interface configured to remotely administer and control each virtual machine.

26. A non-transitory computer-readable storage medium having instructions stored thereon which when executed by a processor result in the following operations comprising:
configuring a virtualization management module for deployment on a server system;
generating and configuring at least one virtual machine on the server system;
configuring an internal network between the virtualization management module and the at least one virtual machine;
translating, by the virtualization management module, transmit and receive packets between an external internet IP address and the internal network; and
decoupling, by the virtualization management module, the internal network from the external internet IP address in the event of a detected security threat on the external internet IP address.

27. The non-transitory computer-readable storage medium of claim 26, further comprising the operations of:

assigning each virtual machine on the internal network an internal IP address, wherein each internal IP address is hidden from the external internet IP address.

28. The non-transitory computer-readable storage medium of claim 26, further comprising the operations of:
providing, by the virtualization management module, administration and control over each virtual machine on the internal network.

29. The non-transitory computer-readable storage medium of claim 26, further comprising the operations of:
performing secure virtualization management module processing on a trusted platform module, wherein the secure processing further comprises data encryption.

30. The non-transitory computer-readable storage medium of claim 26, further comprising the operations of:
remotely administering and controlling each virtual machine through a network accessible user interface.

* * * * *